United States Patent [19]
Janik et al.

[11] Patent Number: 5,484,527
[45] Date of Patent: Jan. 16, 1996

[54] MODULE FOR FILTER ASSEMBLY BASE

[75] Inventors: Leon P. Janik, Suffield; M. Craig Maxwell, Colchester, both of Conn.

[73] Assignee: Stanadyne Automotive Corp., Windsor, Conn.

[21] Appl. No.: 166,226

[22] Filed: Dec. 13, 1993

[51] Int. Cl.⁶ .................................................. B01D 35/30
[52] U.S. Cl. .......................... 210/232; 210/249; 210/438
[58] Field of Search .................................. 210/438–441, 210/443, 444, 249, 232

[56] References Cited

U.S. PATENT DOCUMENTS

| | | | |
|---|---|---|---|
| 4,298,465 | 11/1981 | Druffle | 210/304 |
| 4,456,529 | 6/1984 | Shinaver | 210/440 |
| 4,976,852 | 12/1990 | Janik et al. | 210/86 |
| 5,203,994 | 4/1993 | Janik | 210/438 |
| 5,256,284 | 10/1993 | Lee | 210/232 |

FOREIGN PATENT DOCUMENTS 335693  10/1930  United Kingdom .................. 210/440

*Primary Examiner*—Matthew O. Savage
*Attorney, Agent, or Firm*—Chilton, Alix & Van Kirk

[57] ABSTRACT

A filter assembly employs a base which mounts a disposable filter element cartridge. The cartridge includes either a single stage or a dual stage filter system. The base has custom and generic structural members. Variations in base design are accommodated in the custom member, the generic member having a generic design. The custom member is molded from polymeric material and requires no additional machining or treatment prior to use. This eliminates filter model specific shop fixtures and gigs, reducing costs and providing greater flexibility.

11 Claims, 4 Drawing Sheets

MODULE FOR FILTER ASSEMBLY BASE

BACKGROUND OF THE INVENTION

This invention relates generally to devices for filtering and separating liquids. More particularly, the present invention relates to filters for removing foreign particles and separating water from fuel of the fuel supply system or lubricating oil of an internal combustion engine.

The absence of high standards of quality control in diesel fuel supplies dictates that an effective fuel filter be incorporated into the fuel supply system of a diesel engine. It is not uncommon for diesel fuel to have significant quantities of abrasive particles and water. The abrasive particles present the potential for permanent damage to components of the fuel injection pump. The abrasive particles can also adversely affect the performance of the pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components. Similarly, water and particulate matter in the lubricating oil must be removed to minimize wear of engine parts.

Commonly, filters employ a disposable filter cartridge which is replaced at pre-established intervals of filter usage. The cartridge is secured to a base assembly that is fixedly mounted to the engine header or some other fixed location. Variations between mounting locations and space constraints between different model engines and different manufacturers require a wide variety of filter designs.

Current filter assemblies to which the invention relates employ a base assembly principally composed of a metal casting. Such castings must be machined and treated before they are suitable for use. Machining and treatment jigs and fixtures suitable for one filter design are commonly unsuitable or have limited use in other filter designs. Consequently, tooling costs are a significant component in the cost of the finished product. Additionally, production lines must change from one set of tooling to another when the line shifts production from one model to another. This process is time consuming, adding to production costs and limiting production flexibility.

SUMMARY OF THE INVENTION

Briefly stated, the invention in a preferred form is a filter assembly wherein the base assembly comprises custom and generic structural members. Variations in filter base design are accommodated in the upper custom member, the lower generic member has a generic design. The custom member is molded from polymeric material. The generic member may be molded polymeric material or cast metal. Molded polymeric material components require no additional machining or treatment prior to use, thereby eliminating the machining and treating jigs and fixtures and production line changeovers heretofore required.

In one embodiment the base is comprised of joined custom and generic structural members. The custom member comprises a central axial bore defined by an integral elongated sleeve-like conduit, an intermediate concentric sleeve-like conduit of reduced length, an outer locating ring and a base plate. The generic member comprises a base plate and an outer sleeve. The generic member base plate has an aperture for receiving the first and second conduits and the locating ring. Screws may be used to join the custom and generic member base plates. An end cap seals the top of the custom member by means of a seal ring and a sonic weld, providing a fluid tight connection with respect to the upper cavity of the custom member.

The disposable filter cartridge is partially received within the generic member sleeve and is sealable with the first and second axial conduits which are partially received in the cartridge. The cartridge may include one or more filter elements. The flow path through the cartridge traverses through the first conduit, the filter elements and the second conduit. A retainer element is employed for locking the cartridge to the base.

An object of the invention is to provide a new and improved filter assembly.

Another object of the invention is to provide a new and improved filter assembly wherein variations in filter base design are accommodated by custom structural member made from molded polymeric material.

A further object of the invention is to utilize precision molding techniques and materials such that the polymeric base assembly components require no additional machining or treatment prior to use, thereby eliminating expensive machining and treatment jigs and fixtures and time consuming production line changeovers.

Other objects and advantages of the invention will become apparent from the drawings and the specification.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DETAILED DESCRIPTION OF THE PREFERRED EMBODIMENT

Figure 1:
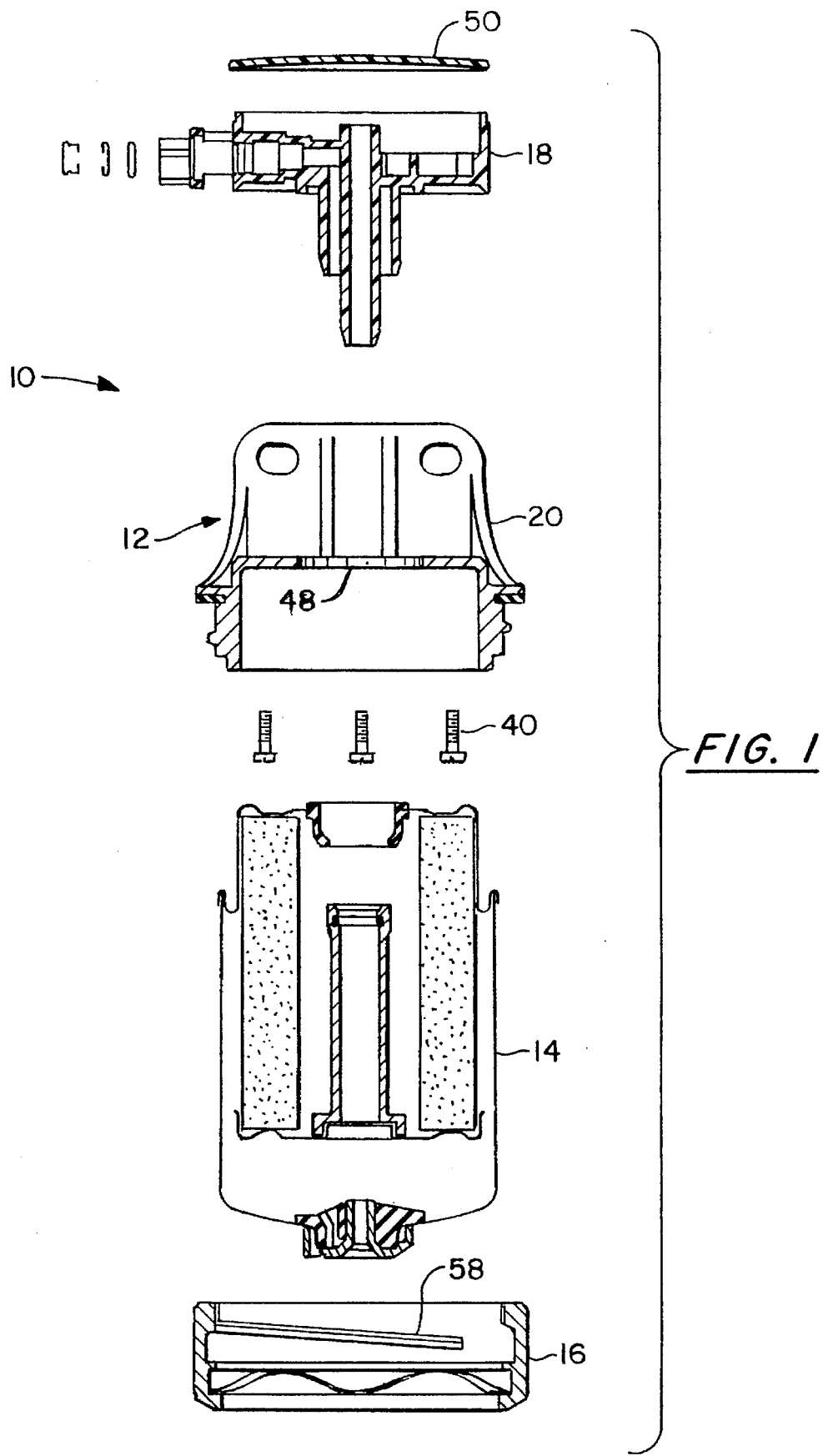
FIG. 1 is an exploded view of a filter assembly in accordance with the present invention.
Figure 2:
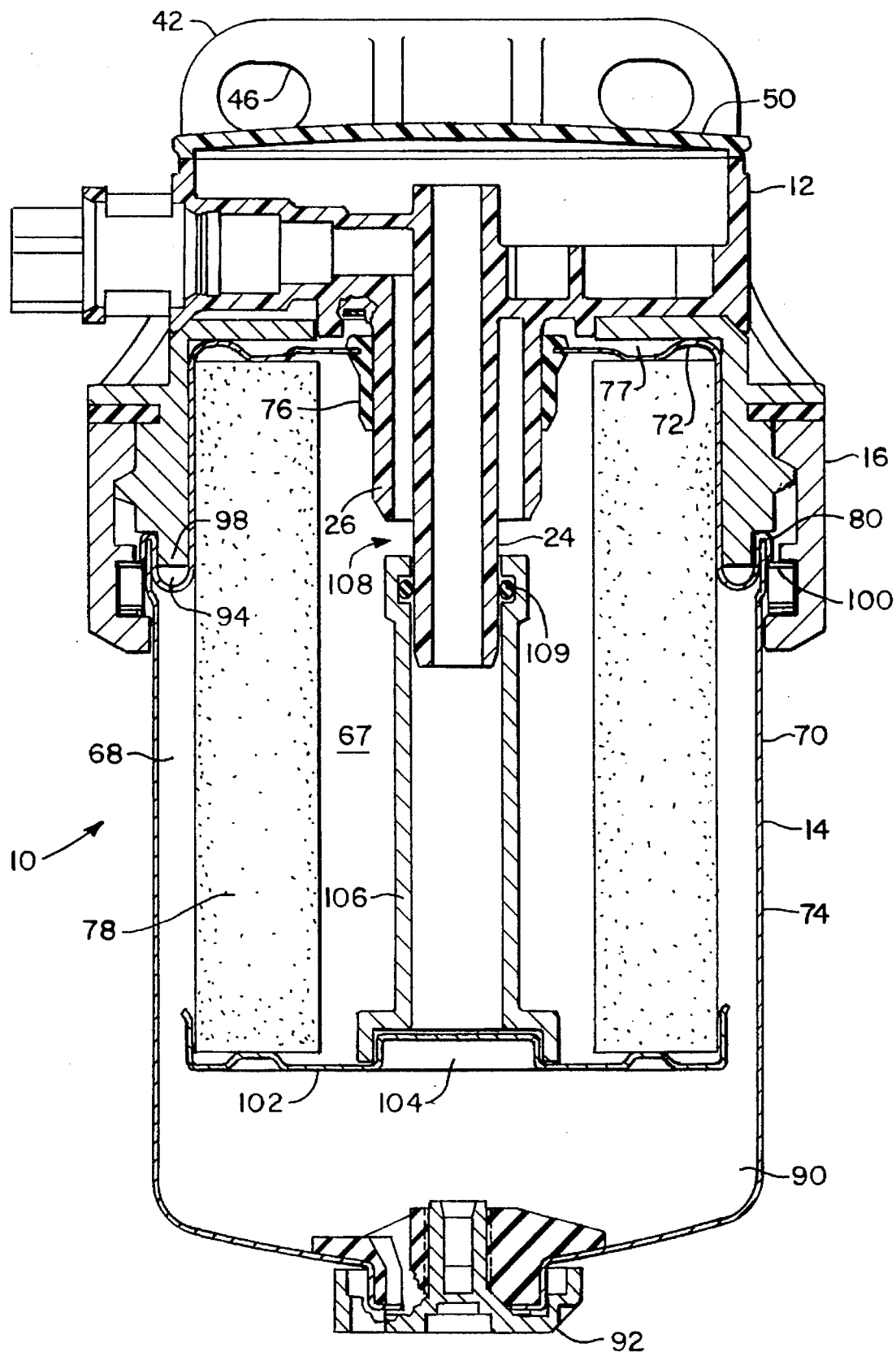
FIG. 2 is a sectional view of the assembled filter assembly of FIG. 1.
Figure 3:
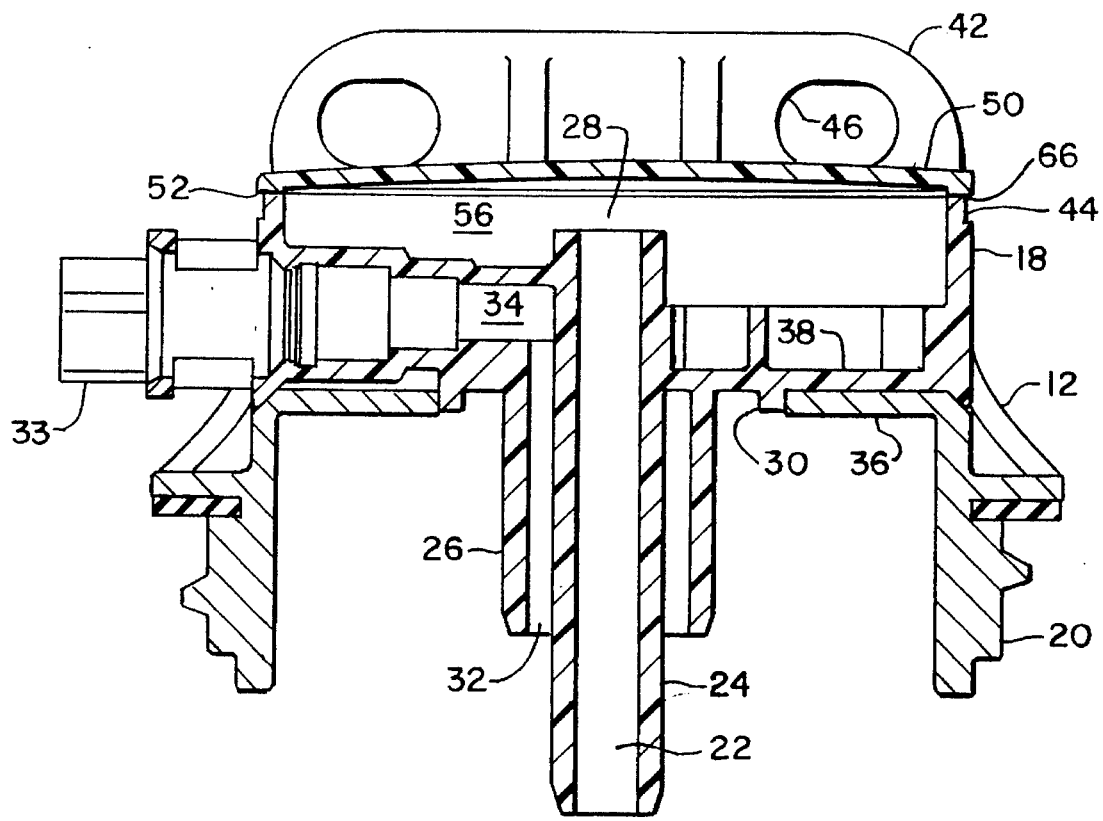
FIG. 3 is a sectional view of the base portion of the fuel assembly FIG. 2.
Figure 4:
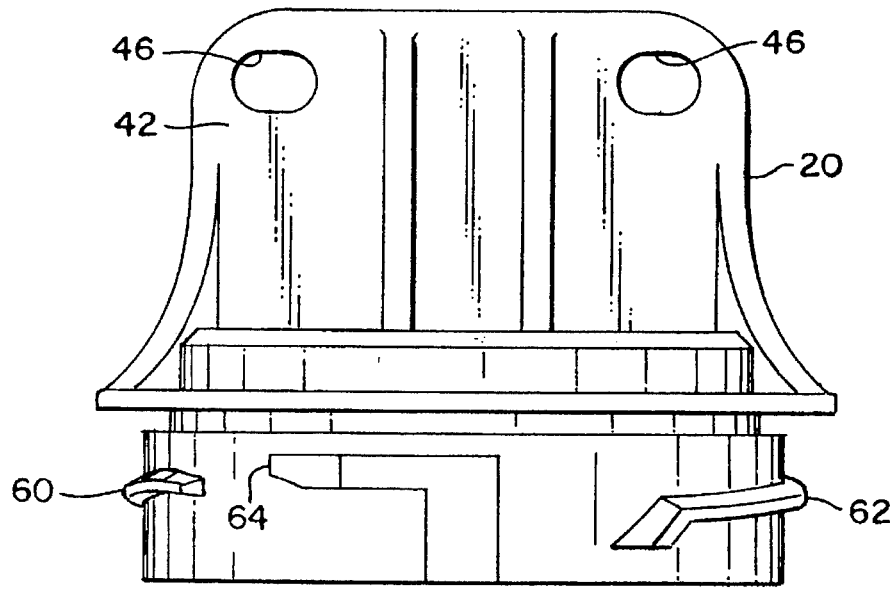
FIG. 4 is a front view of the generic structural member of the fuel assembly base portion of FIG. 3.
Figure 5:
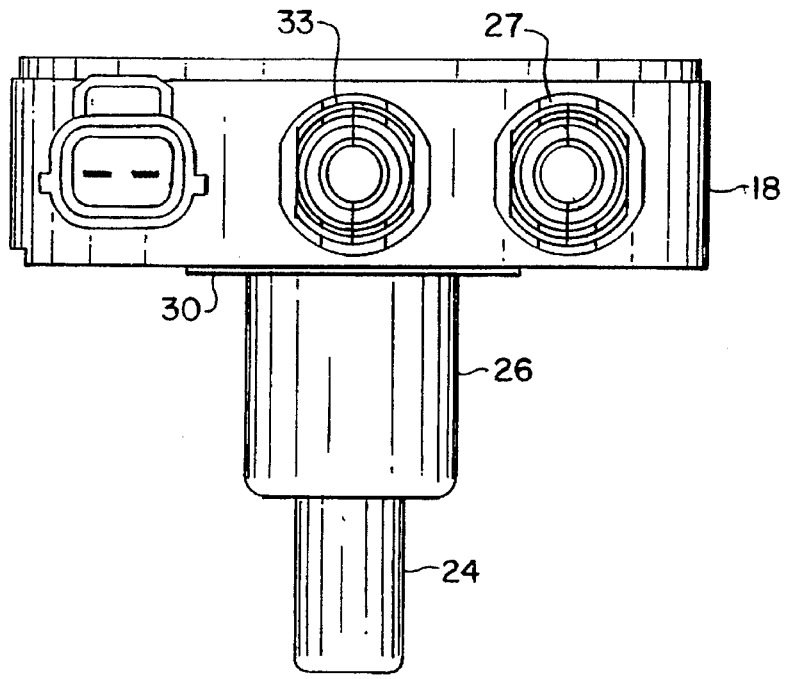
FIG. 5 is a side view of the custom structural member of the fuel assembly base portion of FIG. 3.

With reference to the drawings wherein like numerals represent like parts throughout the several figures, a filter assembly in accordance with the present invention is generally designated by the numeral 10. Filter assembly 10 comprises a base 12 and a disposable filter cartridge 14. The filter assembly is especially adapted for incorporation into the fuel supply system or lubricating oil system of an internal combustion engine (not illustrated), such as a diesel engine, for removing particulate matter from the fuel or oil and for separating water from the fuel or oil. The base 12 is fixedly mounted to the engine header or other fixed location of the vehicle. Filter cartridge 14 is secured to the base by means of a retainer collar 16.

The base 12 forms an inverted cup-like receptacle which defines a lower receiving cavity for the upper portions of the disposable cartridge. The base 12 is comprised of joined custom 18 and generic 20 structural members. The custom structural member 18 is precision molded from polymeric material, wherein the cast member requires no additional machining or treating. Screws 40 may be used to join the custom 18 and generic 20 members.

The molded custom member 18 comprises a central axial bore 22 defined by an elongated sleeve-like conduit 24, an intermediate concentric sleeve-like conduit 26 of reduced length, a coupling plate 38, an outer locating ring 30, and an upper circumferential lip 44. The upper lip 44 abuts the annular ring 52 of end-cap 50. The end-cap 50 is sealed to the custom member 18 by means of sonic weld 66 to provide a fluid tight connection with respect to an upper cavity 56 of the base 12.

Figure 6:
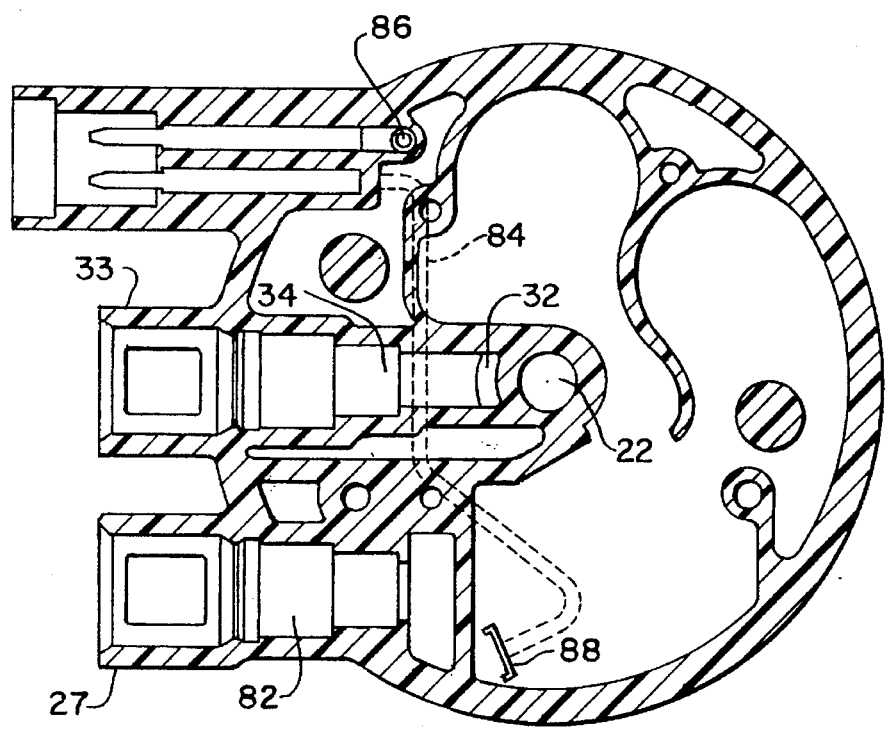
FIG. 6 is a top sectional view, partly in phantom, of the fuel assembly base portion custom structural member of FIG. 5, said custom structural member being rotated 90° to the orientation of FIG. 5.

Conduits 24 and 26 provide generally co-axial fluid communication between the base and the disposable cartridge. An inlet passage 82 includes an inlet connector 27 at custom member side location for connection with a supply line (not shown). The inlet passage 82 provides fluid communication via the base upper cavity 56 from the axial central bore 22 defined by conduit 24. An outlet connector 33 at custom member side location connects with a supply line (not shown) to provide fluid communication via passageway 34 from the axial fluid conduit 32 defined between the first and second conduits 24 and 26. Alternatively, the inlet connector 27 and the outlet connector 33 may be located at different locations on the custom member 18. Such location is determined by the particular design requirements and constraints of each type of vehicle. The inlet 82 and outlet 34 passageways may be a stepped-bore design, as shown in FIG. 6, single bore, tapered bore, or other design as dictated by filter design requirements, mold design requirements and material requirements.

The custom member 18 may also include structures for an electric heater (not shown). An electrical connector 84 is connected to electrical posts 86 and 88. An electric heater is disposed in the base upper cavity 56 and connected to electrical posts 86 and 88 for heating the fuel or oil during cold conditions. Where no electric heater is required, the design shown in FIG. 6 may be utilized and the electric heater omitted. Alternatively, the custom member design may omit the electric heater and the electrical connector 84 and electric posts 86 and 88.

The custom member 18 and the end-cap 50 are molded from an elastomeric material for example Valox DR-48™, Ultradur B-4300-G4™, or RTP 1103™, that requires no additional machining or treatment prior to use. Use of such material eliminates the need for machining and treating jigs and fixtures and production line changeovers heretofore required to properly finish said parts.

The generic member 20, which may be cast from metal, comprises a coupling plate 36 having an aperture 48 for receiving the first and the second conduits 24 and 26 and the locating ring 30. An integral projecting bracket 42 for anchoring the filter base 12 to the engine header projects transversely from the back of the generic member 20. The bracket 42 contains one or more slots 46 to facilitate mounting the base to the header or other appropriate structure of an internal combustion engine.

The disposable filter cartridge 14 comprises a can-like container 70 which is formed by a pair of lower and upper cup-like metal sections 72 and 74 which are joined along a circumferential roll seam 80. The truncated upper section 72 is a molded member which includes a central axial opening. An upper sealing grommet 76 mounted at the opening diametrally seals against the outer conduit 26. The top surface of container section 72 is contoured to form an annular recess 77.

A filter element 78 which has a continuous fan-shaped pleated configuration is housed within the container 70. The filter element 78 axially extends approximately three quarters of the length of the container 70. The filter element 78 thus defines an interior axial chamber 66 and quasi-annular outer chamber 68. The filter element 78 is affixed with resin binders or other water coalescers so that as fuel or oil passes through the filter element 78, the water coalesces to form water droplets. A sump 90 is formed at the bottom of the lower section 74 to collect water which coalesces from the fuel or oil. A drain cock 92 is disposed in the lower portion 74 of the cartridge for draining the water.

The lower end of the filter element 78 is engaged by a plate 102 which has a central port 104. A tubular structure 106, coaxial to the central port 104, engages the plate 102 and extends upward a part of the length of the interior axial chamber 66. The tubular structure 106 coaxially receives a lower portion of the inner conduit 24 wherein the vertical gap between the lower end of the outer conduit 26 and the upper end of the tubular structure 106 defines a passage 108 for the flow of fuel or oil out of the filter element 78 via the axial fluid conduit 32. A lower sealing grommet 108 mounted adjacent the upper end of the tubular structure 106 diametrally seals against the inner conduit 24.

Alternatively, the disposable cartridge may comprise dual filter elements having a continuous fan-shaped configuration.

The cartridge includes an annular recess 94. The annular recess 94 is located inwardly adjacent the roll seam 80. The recess defines one or more slots for receiving complementary keys 98 projecting from the end of the base. The retainer collar 16 includes a rim-like shoulder 100 for retentively engaging the roll seam 80.

The base generic member 20 includes a pair of integral outwardly projecting, diametrically disposed ramps 60 and 62. Each of the ramps ascends in spiral-like fashion in excess of 90° around the base. The upper ends of the ramps are beveled. Stops 64 are angularly spaced from the respective upper ends of the ramps. Spiral-like ramps 58 of the collar 16 are dimensioned and positionable for engagement with the ramps 60, 62 and stops 64 of the base, so that the collar ramps 58 slideably engage and ascend the generic member ramps 60, 62 upon alignment and angular rotation of the collar. The inclination angle of the upper surfaces of the generic member ramps and the underside surfaces of the collar ramps 58 are constant and substantially equal. The upper ramp surfaces of the generic member ramps 60, 62 and the underside surface of the retainer collar ramps 58 engage along an extended substantially surface-to-surface interface. The locked position may be facilitated by the leading end of the collar ramps 58 engaging the stops 64.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter assembly comprising:

base means comprising a first module having an inlet, an outlet, and integral first and second axial conduits in fluid communication with said inlet and outlet respectively, said base means further comprising a second module formed separately of said first module, said second module having an aperture for receiving said first and second axial conduits, and joining means for joining said first module to said second module;

filter cartridge means engaging said base means and fluidically communicating with said base means via said first and second conduits, said cartridge means having filtering means for filtering a liquid which traverses a flow path through said filtering means from said first conduit;

and retainer means for lockably securing said cartridge means to said second module.

2. The filter assembly of claim 1 wherein said first module further comprises locating means for positioning said first and second conduits within aperture of said second module.

3. The filter assembly of claim 1 further comprising an end-cap mounted to said first module, wherein said end-cap and said second module together define a cavity, wherein said cavity provides fluid communication between said inlet and said first axial conduit.

4. The filter assembly of claim 3 wherein said end-cap and said first module are connected by means of a sonic weld.

5. The filter assembly of claim 1 wherein said first module further comprises a coupling plate extending laterally of said first and second axial conduits, said second module further comprises a coupling plate having said aperture therein, and said joining means for joins said coupling plate of said first module to said coupling plate of said second module.

6. The filter assembly of claim 5 wherein said fastening means comprises at least one screw.

7. The filter assembly of claim 1 wherein said first module and said end-cap are molded members composed of a polymeric material.

8. A filter base assembly comprising:

first module composed of polymeric material, said first module having a first plate, an inlet, an outlet, and first and second conduits in fluid communication with said inlet and outlet, respectively;

a second module formed separately of said first module, said second module having a second plate defining an aperture for receiving said first and second conduits, joining means for joining said first plate to said second plate; and an end-cap composed of a polymeric material mounted to said first module, said end-cap at least partially defining a cavity with said first module, wherein said cavity provides fluid communication between said inlet and said first conduit.

9. The filter base assembly of claim 8 wherein said second module is composed of cast metal or a polymeric material.

10. The filter base assembly of claim 9 wherein said end-cap is sonically welded to said first module.

11. The filter base assembly of claim 10 wherein said first module further comprises locating means for positioning said first and second conduits within said aperture.

* * * * *